United States Patent [19]
Mooney et al.

[11] 4,101,103
[45] Jul. 18, 1978

[54] CRADLE TYPE CONDUIT HANGERS

[75] Inventors: Thomas Mooney, Mt. Sinai; Sami Shemtov, Central Islip, both of N.Y.

[73] Assignee: I.T.E. Imperial Corporation, East Farmingdale, N.Y.

[21] Appl. No.: 745,011

[22] Filed: Nov. 26, 1976

Related U.S. Application Data

[63] Continuation of Ser. No. 591,408, Jun. 30, 1975, abandoned.

[51] Int. Cl.² .............................................. F16L 3/12
[52] U.S. Cl. ....................................... 248/58; 248/62; 248/305; 248/317
[58] Field of Search ............... 248/58, 62, 74 R, 74 A, 248/49, 65, 305, 306, 316 F, 317; 24/248 B, 248 SL, 248 BJ, 248 D, 249 R, 249 FP, 249 PP, 254, 232 G; 16/171, 172; 294/110 R, 113

[56] References Cited

U.S. PATENT DOCUMENTS

| 451,182 | 4/1891 | Gaillac | 248/305 X |
|---|---|---|---|
| 472,068 | 4/1892 | Newbury | 248/62 |
| 658,042 | 9/1900 | Mendel | 24/254 |
| 1,219,045 | 3/1917 | Schmidt | 248/306 |
| 1,220,758 | 3/1917 | Lamphiear | 248/306 X |
| 1,442,101 | 1/1923 | Smith | 24/232 G |
| 1,510,137 | 9/1924 | Crockett | 248/305 X |
| 1,773,838 | 8/1930 | Zifferer | 248/62 |
| 2,108,347 | 2/1938 | Quarnstrom | 248/74 A |
| 2,474,080 | 6/1949 | Witte | 248/305 X |
| 2,712,916 | 7/1955 | Franz | 248/74 R X |
| 2,999,661 | 9/1961 | Shuter | 248/62 |
| 3,044,739 | 7/1962 | Attwood | 248/58 |
| 3,191,899 | 6/1965 | Kindorf | 248/62 |
| 3,323,766 | 6/1967 | Schauster | 248/62 |
| 3,494,071 | 2/1970 | Simmon | 248/49 X |
| 3,659,319 | 5/1972 | Erickson | 248/74 A X |

FOREIGN PATENT DOCUMENTS

| 146,606 | 8/1954 | Sweden | 248/317 |

Primary Examiner—Roy D. Frazier
Assistant Examiner—Rodney H. Bonck
Attorney, Agent, or Firm—Howard C. Miskin

[57] ABSTRACT

A conduit hanger includes an inverted U-shaped bracket having laterally spaced depending legs swingable supporting at their bottoms closure arms. The closure arms are swingably between a closed position extending toward each other and gravity urged toward such position and being urged upward under pressure to an open position providing bottom access between the bracket legs. One or both closure arms may be provided with openings proximate their inner ends and the other arms may be provided with depending legs for engaging a respective opening. In another form, a closure arm projects through an opening in one bracket leg toward the other and is pivotted at its outer end to the bottom of a link whose top is pivotted to the upper outer face of the bracket leg.

8 Claims, 8 Drawing Figures

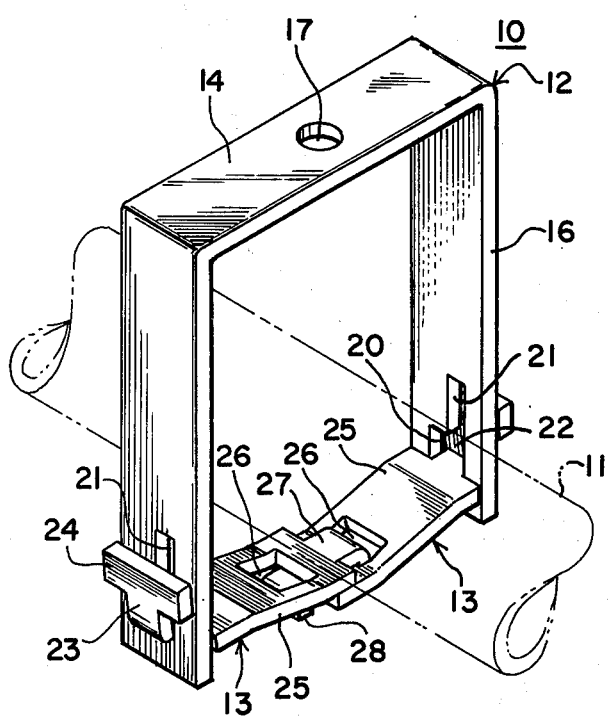
Fig. 1.
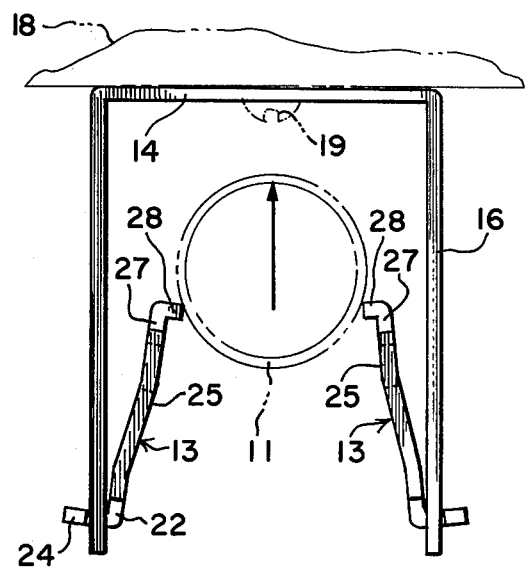
Fig. 2.
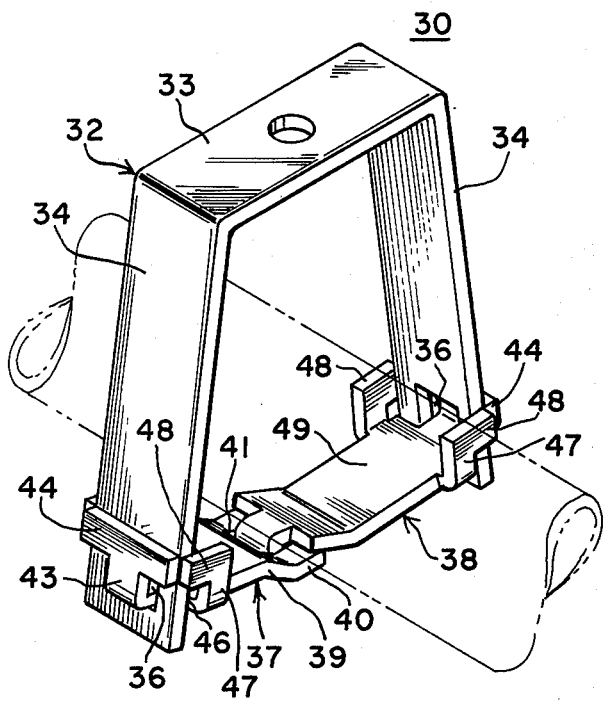
Fig. 3.
Fig. 4.

U.S. Patent   July 18, 1978   Sheet 2 of 2   4,101,103
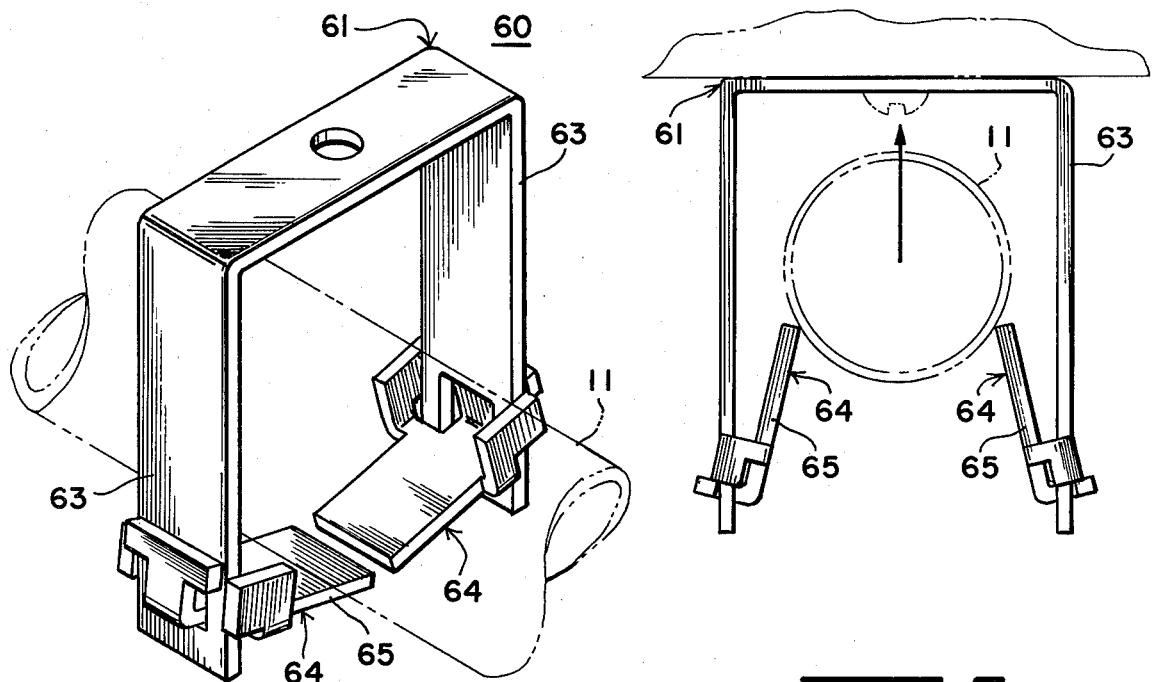
Fig. 5.
Fig. 6.
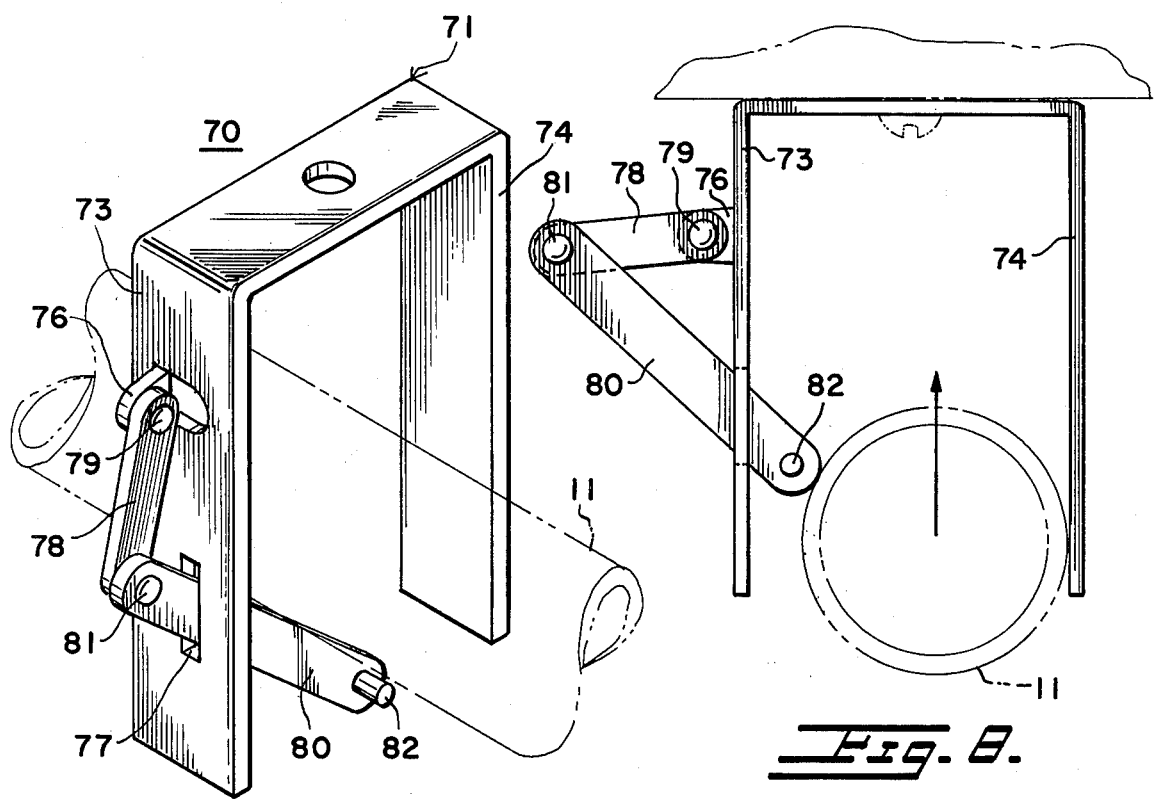
Fig. 7.
Fig. 8.

CRADLE TYPE CONDUIT HANGERS

This is a continuation, of application Ser. No. 591,408, filed June 30, 1975, now abandoned.

BACKGROUND OF THE INVENTION

The present invention relates generally to improvements in overhead suspension devices and it relates more particularly to an improved hanger for conduits, such as electrical conductor carrying conduits, pipe and similar members, cables and the like.

In the installation of utility distribution members, such as electrical cable, electrical cable carrying conduits of the rigid or flexible types, water, steam or compressed air carrying pipes and the like it is a common practice to suspend the cable or conduit from the ceiling or other overhead structure by means of hanger devices which are attached to the overhead structure for vertical adjustment by studs, bolts or similar hanging fasteners. However, the hanger devices heretofore employed or proposed possess numerous disadvantages. Among the important drawbacks of the earlier hanger devices of the subject type are the inconveniences, awkwardness and difficulties encountered in coupling the conductor cable to the hanger device and locking it in its coupled or suspended condition. The operation of the hanger device incident to the application of the cable or conduit requires considerable manipulation oftentimes requiring the services of two persons, one to hold and the other to position the conduit which is highly time consuming and the hangers are frequently unreliable, expensive and of little versatility and adaptability.

SUMMARY OF THE INVENTION

It is therefore a principal object of the present invention to provide an improved mounting device for conduit, cable and the like.

Another object of the present invention is to provide an improved hanger device for conduit, cable and the like.

Still another object of the present invention is to provide an improved conduit hanger in which the locked coupling of the conduit to the hanger is rapid, simple, convenient and positive and requires a minimum of manipulation.

A further object of the present invention is to provide a hanger of the above nature characterized by its high reliability, ruggedness, simplicity, low cost and great adaptability.

The above and other objects of the present invention will become apparent from a reading of the following description taken in conjunction with the accompanying drawings which illustrate preferred embodiments thereof.

In a sense the present invention contemplates the provision of a improved hanger for conduit, cable or the like comprising an overhead bracket, including a pair of laterally spaced, depending legs delineating an access opening between their lower portions and gate means supported by the bracket and movable between a depressed, closed position restricting the access opening, and a raised open position providing access through the opening, the gate means being normally urged toward its closed position and being movable to its open position in response to an upward pressure thereon.

According to the preferred form of the improved hanger the bracket is of inverted U-shaped configuration including an upper cross piece and depending parallel or diverging side legs, the cross piece having a medial aperture for receiving a threaded hanger shank or screw. The closure means includes a pair of closure arms swingably mounted at the lower ends of the bracket side legs and directed toward each other, the closure arms being restricted in their downward movement to approximately horizontal positions closing the access opening and being freely upwardly swingable to expose the access opening. One or both closure arms are provided proximate their free ends with latch openings which are releasably engaged by lugs depending from the free ends of the other closure arms. In an alternative form of the present hanger an opening is formed in the lower portion of one of the bracket legs and a closure arm projects downwardly and upwardly through the opening and is pivoted at its outer end to the lower end of a link whose upper end is pivoted to the outside face of the bracket leg.

The application of a conduit or cable to the hanger device is simply accomplished merely by raising the conduit or cable through the access opening against the closure arms to swing the closure arms open, and when the closure arms are cleared by the conduit, they return to their closed positions and the conduit or cable is then permitted to drop and rest on the closure arms. The improved hanger is reliable, rugged and simple, easy and convenient to use and of great versatility and adaptability.

BRIEF DESCRIPTION OF THE DRAWINGS

FIG. 1 is a perspective view of a hanger device embodying the present invention shown in closed condition and supporting a conduit, shown in phantom.

FIG. 2 is a front elevational view thereof shown in open condition attendant to the application of a conduit;

FIG. 3 is a view similar to FIG. 1 of another embodiment of the present invention;

FIG. 4 is a view thereof similar to FIG. 2;

FIG. 5 is a view similar to FIG. 1 of still another embodiment of the present invention;

FIG. 6 is a view thereof similar to FIG. 2;

FIG. 7 is a view similar to FIG. 1 of a further embodiment of the present invention; and FIG. 8 is a view thereof similar to FIG. 2.

DESCRIPTION OF THE PREFERRED EMBODIMENTS

Referring now to the drawings, particularly FIGS. 1 and 2 thereof which illustrate a preferred embodiment of the present invention, the reference numeral 10 generally designates the improved hanger device illustrated as applied to the suspension of a conduit 11 and comprising a bracket 12 and a pair of closure arms 13 of similar construction. The bracket 12 is of inverted U-shaped configuration and includes a horizontal laterally extending top crosspiece 14 and a pair of opposite parallel vertical legs 16 depending from opposite ends of cross piece 14. A central opening 17 is formed in the cross piece 14 to facilitate to attachment of the bracket 12 to an overhead structure 18 by means of a screw 19. Formed proximate the bottom of each of the bracket legs 16 is a rectangular pivot opening 20 provided at its upper corner with a communicating vertical slot 21 of reduced width permitting the assembly of the closure arms 13 to bracket legs 16.

A closing arm 13 is swingably supported by each bracket leg 16 which, in its normal closed condition includes a slightly undulate rectangular main body portion 25 of the width of the bracket leg 16 and of a length somewhat greater than half the distance between the bracket legs 16 and being slightly downwardly inwardly inclined. Projecting medially outwardly from the outer edge of each body portion 25 facing bracket leg 16 is a shank 22 of lesser width than body portion 25 and of slightly lesser width than pivot opening 20. The shank 22 is provided at its end with an upwardly projecting arm 23 terminating in a cross bar 24 of greater width than opening 20 and less than the combined heights of openings 20 and 21. The shank 22 and arm 23 engage the respective opening 20 to swingably support each respective closure arm 13, the cross bar 24 being adjacent the outside face of the bracket leg 16 when the respective closure arm 13 is in its closed horizontal position restricting the further downward swinging of the respective closure arm 13.

A rectangular latch opening 26 is formed proximate the free end of each body portion 25. Medially outwardly projecting from each body member free end is a short arm 27 terminating in a depending finger 28 engaging the opening 26 in an opposite closure arm 13 when the arms 13 are in their lowered closed positions as shown best in FIG. 1.

Considering now the operation of the improved hanger 10, the bracket 12 is first secured to an overhead support 18 such as a beam, ceiling, by a screw or other fastener 19. The conduit 11 is then raised through the bracket bottom opening bearing on the underfaces of the closure arms 13 to swing them upwardly, as shown in FIG. 2 and is then further raised to clear the ends of the closure arms and permit them to swing downwardly to their normally closed position under the influence of gravity. The conduit 11 is then released to rest on the depressed closure arms 13 which are restricted against any further downward movement by shank 23 and cross bar 24 abutting bracket legs 16, as earlier described and as shown in FIG. 1. The engagement of finger 28 in opening 26 of the mating closure arm 13 restricts separating movement of arm 13 by the weight of the conduit. Since both arms 13 have opening 26 and finger 28, it is immaterial which is the bottom and which is on top. Thus, the conduit 11 is coupled to the bracket 12 merely by raising and releasing the conduit. Thus only one person can position the conduit within hanger 10.

In FIGS. 3 and 4 of the drawings, there is illustrated another embodiment of the present invention which differs from that first described mainly in the construction and relationship of the closure arms. Specifically the modified hanger 30 includes a bracket 32 having cross arm 33 and downwardly diverging depending side legs 34 provided proximate their bottoms with rectangular pivot openings 36. A pair of inwardly projecting closure arms 37 and 38 respectively are pivotally supported at their distal ends by the bracket legs 34.

The closure arm 37 is relatively short and includes a body member 39 having a downwardly offset distal section 40 provided with a rectangular opening 41. Projecting medially from the proximal end of body member 39 through a corresponding opening 36 in a leg 34 is a shank 42 joining an upwardly directed arm 43 terminating in a cross bar at piece 44 located along the outside face of the respective bracket leg 34. Projecting transversely from opposite sides of body member 39 proximate the shank 42 are coplanar arms 46 which join upright arms 47 which terminate in outwardly directed arms extending to just short of the cross piece 44 and easily movably embrace the respective bracket leg to lock the closure arm 37 to the bracket leg while permitting the swinging thereof between a restricted depressed closed position and a raised open position.

The closure arm 38 is longer than the closure arm 37 and is swingably supported by the opposite bracket leg 34 in the manner of the closure arm 37 and is swingable between a depressed horizontal closed position and a raised open position. The closure arm 38 includes a proximal main section 49 and an upwardly inclined outer end section 50. A medial short arm 51 extends outwardly from the end section 50 and terminates in a depending finger 52 which engages the opening 41 when the closure arms 37 and 38 are in closed position as shown in FIG. 3.

In coupling a conduit 11 to the hanger 30 the conduit is raised between the bracket legs to bear on and open the closure members 37 and 38. With the further raising of the conduit the shorter closure member 37 is first cleared and released to swing to its closed position as shown in FIG. 4, and thereafter the longer closure arm 38 is cleared and released to its closed position overlapping the closure arm 37 with the hook finger 52 engaging the opening 41, as shown in FIG. 3 to lock the arms 37 and 38 against spreading.

Referring now to FIGS. 5 and 6 which illustrate another embodiment of the present invention which differs from that last described in that the closure arms are shortened and do not overlap in their closed position, in which position they are slightly downwardly inclined toward each other. The modified hanger device includes an inverted U-shaped bracket 61 similar in construction to the bracket 32 except that the side legs 63 thereof are vertical and parallel.

The closure arms 64 are similarly shaped and are swingably connected at their proximal ends to the lower portions of the bracket legs 63 in the manner of the closure arms 37 and 38 as earlier described. Each of the arms 64 includes a longitudinally extending rectangular section 65 of a length somewhat less than half the distance between the bracket legs 63. In their closed lowermost positions the closure arms 64 are slightly downwardly inclined toward each other as shown in FIG. 5. The downward slant of arms 64 urge bracket legs 63 together.

The operation of the hanger device 60 is similar to those earlier described except that the closure arms 64 do not interlock in their closed positions.

In FIGS. 7 and 8 of the drawings there is illustrated a further embodiment of the present invention which comprises an inverted U-shaped bracket 71 including a top cross piece and depending parallel vertical side legs 73 and 74. Formed on the upper part of the side leg 73 is an outwardly directed ear 76 and formed in the lower portion of the side leg 73 above the bottom thereof is a vertical medial guide slot 77.

A link 78 is pivotally connected at its top by a pin 79 to the ear 76 and is swingable about a transverse axis between downwardly and outwardly extending positions. A downwardly inwardly inclined closure arm 80 extends through the guide slot 77 and it is pivotted by a pin 81 at its upper outer end to the lower free end of the link 78. Tie link 78 and closure arm 80, under the influence of gravity normally assume a position in which the link 78 extends almost vertically downwardly and the closure arm 80 extends through the guide slot 77 from the pin 81 downwardly inclined toward the bracket leg 74 to greatly restrict the access opening between the bracket legs 73 and 74. A cross pin 82 is provided at the lower end of closure arms 80 to prevent the passage thereof outwardly through the guide slot 77.

In coupling the conduit 11 to the hanger 70, last described, the conduit 11 is raised between the bracket legs 73 and 74 and bears on the bottom free end of closure arm 80 to raise the closure arm 80 and advance it upwardly through the guide slot 77, the advancing arm 80 swinging the link 78 outwardly to draw the closure arm from between the bracket legs 73 and 74 and open the access opening and permit the free upward passage of the conduit 11, as shown in FIG. 8. As the conduit 11 passes above and releases the end of closure arm 11 the closure arm, under the downward force of gravity returns to its access closing position, as shown in FIG. 7 and the conduit 11 is released to rest on the closed closure arm 80 to assume its maintenance in its closed position.

In embodiments of FIGS. 1 – 6, the vertical bracket legs have to be of a length greater than the diameter of the conduit and the length of extension into the bracket of the longest closure arm to allow the arm to drop.

While there have been described and illustrated preferred embodiments of the present invention, it is apparent that numerous alterations, omissions and additions may be made without departing from the spirit thereof.

What is claimed is:

1. A conduit hanger comprising an overhead bracket including a pair of laterally spaced depending legs delineating an access opening between their lower portions, and gate means supported by said bracket, and movable between a depressed closed position restricting said access opening and a raised open position providing access through said opening, said gate means being normally urged toward its closed position and being movable to its open position in response to an upward pressure thereon, said bracket legs being substantially coextensive and having pivot openings formed proximate their lower ends, said gate means comprising a closure arm extending from each of said legs toward the other leg and including a reduced width shank proximate its outer end rockably engaging a respective pivot opening and provided with an upwardly directed lug terminating in a stop section defining a transverse stop member engaging the outer face of the corresponding bracket leg when said closure arm is in said depressed closed position.

2. The conduit hanger of claim 1 wherein said bracket includes an upper cross piece, said legs depending from opposite ends of said cross piece.

3. The conduit hanger of claim 1 wherein at least one of said closure arms has an opening therein proximate its inner end and the other arm terminates in a depending lug engaging said opening when said closure arms are in registry with said access opening.

4. The conduit hanger of claim 1 including a leg extending upwardly from each longitudinal edge of each of said closure arms proximate their outer ends and inwardly of said bracket legs and terminating in rearwardly directed parallel arms embracing respective bracket legs.

5. A conduit hanger comprising an overhead bracket including a pair of laterally spaced depending legs delineating an access opening between their lower portions, gate means supported by said bracket and movable between a depressed closed position restricting said access opening and a raised open position providing access through said opening, said gate means being normally urged toward its closed position and being movable to its open position in response to an upward pressure thereon and comprising a closure arm swingably supported by and extending from a first of said bracket legs toward the second of said bracket legs and disposed across said access opening when said gate means is in its closed position and being upwardly swingable away from said second bracket leg in response to an upward pressure thereon, and means for restricting the downward swinging of said closure arm including stop sections located on said closure arm and said first bracket leg and movable into mutual abutting engagement when said closure arm swings to its closed position to prevent further depression thereof, said bracket legs being substantially coextensive, said first bracket leg having a pivot opening formed proximate its lower end, said closure arm extending from said first leg including a reduced width shank proximate its outer end rockably engaging said pivot opening and provided with an upwardly directed lug terminating in a transverse stop member engaging the outer face of said first bracket leg when said closure arm is in said depressed closed position.

6. A conduit hanger comprising an overhead bracket including a pair of laterally spaced depending legs delineating an access opening between their lower portions, gate means supported by said bracket and movable between a depressed closed position restricting said access opening and a raised open position providing access through said opening, said gate means being normally urged toward its closed position and being movable to its open position in response to an upward pressure thereon, and comprising a closure arm swingably supported by and extending from each of said bracket legs toward the other said bracket legs and disposed across said access opening in overlapping relation when said gate means is in its closed position and each being upwardly swingable in response to an upward pressure thereon to receive a conduit, and means for restricting the downward swinging of each of said closure arms including stop sections located on each closure arm and its corresponding bracket leg and movable into mutual abutting engagement when said closure arms swing to their closed overlapping position to prevent further depression thereof and support the conduit, at least one of said closure arms having an opening therein proximate its inner end and the other arm terminating in a depending lug engaging said opening when said closure arms are in registry with said access opening.

7. A conduit hanger comprising an overhead bracket including a pair of laterally spaced depending legs delineating an access opening between their lower portions, gate means supported by said bracket and movable between a depressed closed position restricting said access opening and a raised open position providing access through said opening, said gate means being normally urged toward its closed position and being movable to its open position in response to an upward pressure thereon and comprising a closure arm swingably supported by and extending from each of said bracket legs toward the other of said bracket legs and disposed across said access opening when said gate means is in its closed position and being upwardly swingable in response to an upward pressure thereon, one of said closure arms being longer than the other, the shorter closure arm having an opening therein proximate its inner end and the longer arm having a depending lug engaging said opening when said closure arms are in registry with said access opening and means for restricting the downward swinging of each of said closure arms including stop sections located on each closure arm and its corresponding bracket leg and movable into mutual abutting engagement when said closure arm swings to its closed position to prevent further depression thereof.

8. A conduit hanger comprising an overheat bracket including a pair of laterally spaced depending legs delineating an access opening between their lower portions, gate means supported by said bracket and movable between a depressed closed position restricting said access opening and a raised open position providing access through said opening, said gate means being normally urged toward its closed position and being movable to its open position in response to an upward pressure thereon and comprising a pair of closure arms, each swingably supported by and extending from a corresponding bracket leg toward the other of said bracket legs and disposed across said access opening in spaced aligned relation when said gate means is in its closed position and each arm being upwardly swingable away from the other arm toward its corresponding bracket leg in response to an upward pressure thereon, and means for restricting the downward swinging of each of said closure arms including stop sections located on each closure arm and its corresponding bracket leg and movable into mutual abutting engagement when said closure arms swing to their closed position to prevent further depression thereof, said bracket legs being substantially coextensive and each having a pivot opening formed proximate its lower end, each of said closure arms extending from its corresponding leg including a reduced width shank proximate its outer end rockably engaging said respective pivot opening and provided with an upwardly directed lug terminating in a transverse stop member engaging the outer face of its corresponding bracket leg when said respective closure arm is in its depressed closed position.

* * * * *